United States Patent [19]

Junker et al.

[11] Patent Number: 4,528,856
[45] Date of Patent: Jul. 16, 1985

[54] EDDY CURRENT STRESS-STRAIN GAUGE

[75] Inventors: Warren R. Junker, Monroeville; William G. Clark, Jr., Murrysville, both of Pa.

[73] Assignee: Westinghouse Electric Corp., Pittsburgh, Pa.

[21] Appl. No.: 571,610

[22] Filed: Jan. 17, 1984

[51] Int. Cl.³ .............................................. G01B 7/16
[52] U.S. Cl. ...................................... 73/779; 324/209
[58] Field of Search ................. 73/779, DIG. 2, 643; 324/209

[56] References Cited

U.S. PATENT DOCUMENTS

| | | | |
|---|---|---|---|
| 2,841,386 | 7/1958 | Everett | 73/517 R |
| 3,007,063 | 10/1961 | Harris | 73/517 R X |
| 3,612,986 | 10/1971 | Rollwitz et al. | |
| 3,636,437 | 1/1972 | Soulant et al. | 73/779 |
| 3,792,348 | 2/1974 | Rollwitz et al. | |
| 3,866,462 | 2/1975 | Fraudin | |
| 4,030,346 | 6/1977 | Dahle et al. | 73/779 X |
| 4,279,163 | 7/1981 | Takekoshi et al. | |

Primary Examiner—Anthony V. Ciarlante
Attorney, Agent, or Firm—Robert P. Lenart

[57] ABSTRACT

The stress or strain in a magnetic workpiece is measured by a method in which the workpiece is locally magnetized by a constant magnetic field, an eddy current probe is placed adjacent to the workpiece, and an electrical characteristic of the probe, which is proportional to stress or strain in the workpiece is measured. The measured value is compared to calibration data to obtain the actual stress or strain. By continually subjecting the workpiece to a constant magnetic field, a maximum value of applied stress can be determined by making a first measurement before an external force is applied to the workpiece and making a second measurement after the force is removed. The difference between the two measurements is proportional to the maximum stress applied to the workpiece by the force between the two measurements. If stress or strain in a nonmagnetic workpiece is to be measured, a layer of magnetic material is bonded to the workpiece at the measurement point.

16 Claims, 5 Drawing Figures

EDDY CURRENT STRESS-STRAIN GAUGE

BACKGROUND OF THE INVENTION

This invention relates to a stress-strain measuring apparatus and methods and more particularly to such apparatus and methods which apply a constant magnetic field to a workpiece during the application and measurement of stress.

Accurate knowledge of the stresses and strains associated with the service loading of structural components is critical to the design of safe, efficient hardware. Common practice is to estimate expected loading conditions through the use of analytical methods and subsequently, to verify these estimates through model testing or in-service monitoring of operating equipment. Experimental measurement of stresses and strains involves the use of strain gauges, such as electrical resistivity gauges designed to respond to changes in the strain, which must be mounted on the hardware of concern at the specific locations of interest. The hardware is then loaded and measurements of strain made at each gauge. The strain measurements are converted to applied stress values using Young's Modulus for the structural material involved to yield an experimental stress analysis. This approach to stress analysis, while often used successfully, has several significant limitations. Specifically, strains can only be measured at the predetermined gauge locations, expensive and complex slip ring or telemetering equipment is required to monitor strains in rotating equipment and strain gauges alone cannot be used to detect residual stresses which may have developed during fabrication.

The use of eddy current techniques to characterize the properties of materials is based on the relationship between material structure and electromagnetic properties. More specifically, eddy current testing relies on electromagnetic interaction between a coil driven by an alternating electrical current and the material under test. In order to measure applied or residual stresses with a conventional eddy current approach, the application of stress must change either the conductivity or permeability of the material such that a detectable change in the test coil impedance occurs. For ferromagnetic materials, it is well known that the application of stress will alter both the electric and magnetic properties. This phenomenon permits the use of eddy current techniques to measure applied and residual stress in structural steels.

SUMMARY OF THE INVENTION

The method of this invention for measuring stress or strain in a magnetic workpiece comprises the steps of: applying a constant magnetic field to a portion of the workpiece which will be subjected to stress; placing an eddy current probe adjacent to the portion of the workpiece which has been subjected to stress; and measuring an electrical characteristic of the eddy current probe, wherein the electrical characteristic is proportional to the stress or strain in the workpiece. The measured value of the electrical characteristic is then compared with calibration data to determine the actual value of the stress in the workpiece when the electrical characteristic was measured. If no external force is applied to the workpiece, this method measures residual stress. If an external force is applied, then total stress will be measured.

Maximum applied stress may be measured by subjecting the workpiece to a constant magnetic field, making a first measurement prior to the application of stress to the workpiece; stressing the workpiece within the constant magnetic field; removing the source of stress; and making a second measurement while the workpiece is still in the magnetic field. Then the difference between the two measurements is compared with a calibration standard to determine the maximum applied stress. If the workpiece is only subjected to the constant magnetic field when the measurements are made, and the second measurement is made while the force is being applied, then the difference between the measured values will be proportional to the stress or strain resulting from the applied force. Stress and strain in non-magnetic workpieces can be measured by the methods of this invention if a magnetic layer is first bonded to the workpiece at the measurement points.

The methods of this invention may be carried out through the use of an eddy current probe for measuring stress or strain in the magnetic workpiece which comprises: a measuring coil having an electrical characteristic being variable as a function of the magnetic permeability of an adjacent workpiece and means producing a constant magnetic field in a portion of the workpiece which is subjected to stress. If the means for producing a constant magnetic field is a magnet within the eddy current probe, the probe can be easily moved from point to point on the workpiece under load to measure strains and stress at various locations.

DESCRIPTION OF THE PREFERRED EMBODIMENTS

Figure 1:
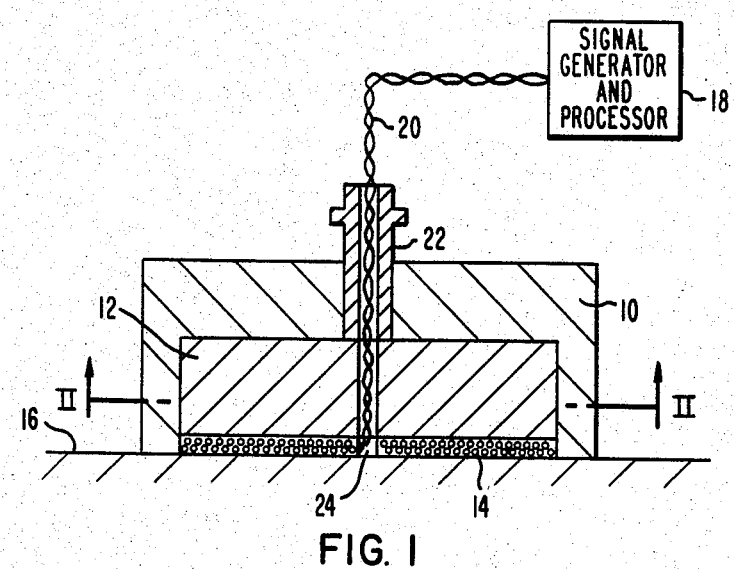
FIG. 1 is a cross-sectional view of an eddy current stress-strain probe, having a constant magnetic bias, as component of a gauge which may be used to measure stress in accordance with the methods of the present invention.

Referring to the drawings, FIG. 1 shows a stress-strain gauge which can be used to perform a stress-strain measurement in accordance with the methods of the present invention. The main probe body 10 is made of a high permeability material such as soft iron. Permanent magnet 12 is located within main probe body 10 and provides a means for generating a constant magnetic field bias. Eddy current coil 14 is disposed between permanent magnet 12 and the surface of workpiece 16. Signal generator and processor 18 includes a means for supplying an alternating current signal by way of cable 20 to eddy current coil 14 and also includes means for measuring a change in the electrical characteristics of eddy current coil 14. Cable 20 passes through connector 22 and a central hole 24 in permanent magnet 12.

Figure 2:
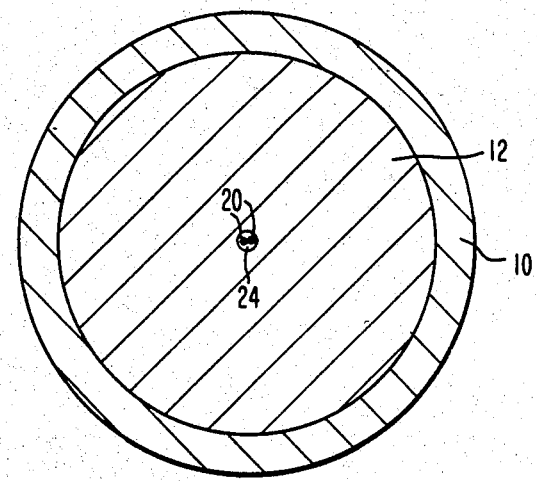
FIG. 2 is a cross-sectional view of the probe of the gauge of FIG. 1 taken along line II—II.

FIG. 2 is a cross-section of the probe of FIG. 1 taken along line II—II. Main probe body 10 is seen to be circular and provides a low reluctance flux path for flux produced by permanent magnet 12 and eddy current coil 14.

Figure 3:
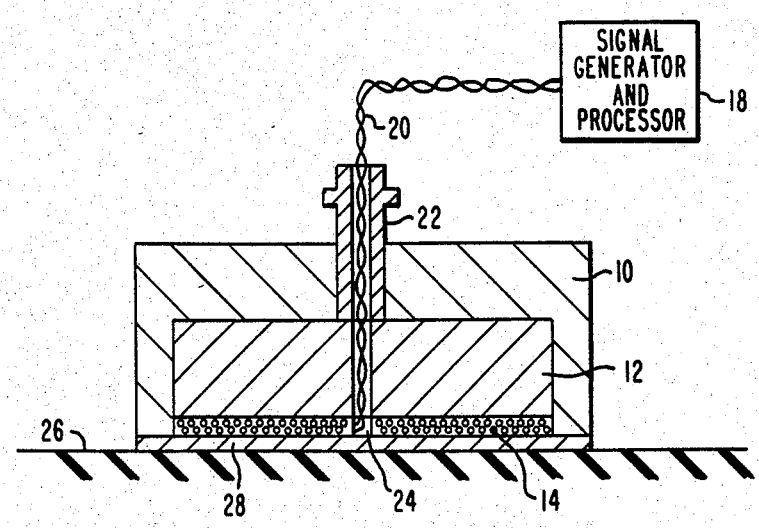
FIG. 3 is an alternative embodiment of the gauge of FIG. 1 for use when measuring stress or strain in a non-magnetic workpiece.

FIG. 3 shows an eddy current stress-strain gauge adapted for measurement of stress or strain in a non-magnetic workpiece 26. In this gauge, a thin layer of magnetic material 28 has been bonded to the non-magnetic workpiece 26 such that the layer and workpiece are subject to the same strain. The magnetic eddy current probe body 10 has been attached to the thin layer of magnetic material to measure stress or strain within the layer. It should be apparent to those skilled in the art that the thin layer of magnetic material may be fashioned by plating or otherwise bonding the layer of magnetic material on the workpiece 26.

The stress-strain gauge probes of FIGS. 1 and 3 operate in accordance with Faraday's Law which states that an electrical conducting loop or coil placed in a changing magnetic field has a voltage generated across the ends of the loop which is proportional to the time rate of change of the field enclosed by the loop. If the loop is closed, a current flows in the loop in a direction opposite to the change in the magnetic field. If the loop is replaced with a conducting plate, the changing magnetic field produces a current in the plate which flows in closed loops and is referred to as an eddy current. Eddy current testing uses, as the source of the changing magnetic field, a coil which is driven by an alternating electric current. The voltage across the coil is proportional to the time rate of change of the magnetic flux generated by the coil. However, as the coil is brought near a magnetic surface, the total magnetic flux seen by the coil is changed by the currents generated in the surface. In turn, the coil voltage is altered.

With the coil driven by a sinusoidal varying current, the relationship between the voltage and current is given by the steady-state equivalent of Ohm's Law, $V = IZ$ where V is the voltage across the coil, I is the current in the coil and Z is the impedance of the coil. In general, the impedance is composed of two orthogonal components. One is associated with the resistance losses in the coil and the other associated with the inductance of the coil. The effect of bringing the coil near a metallic surface is to alter the coil impedance by introducing changes in the inductive component. For a particular coil-material interaction, the exact value of the coil impedance will depend upon: the coil geometry; the spacing between the coil and the material; the electricl conductivity of the material; the magnetic permeability of the material; and the frequency at which the coil is excited. In general, the characterization of materials with a conventional eddy current non-destructive evaluation system involves the measurement of impedance changes rather than impedance alone.

Figure 4:
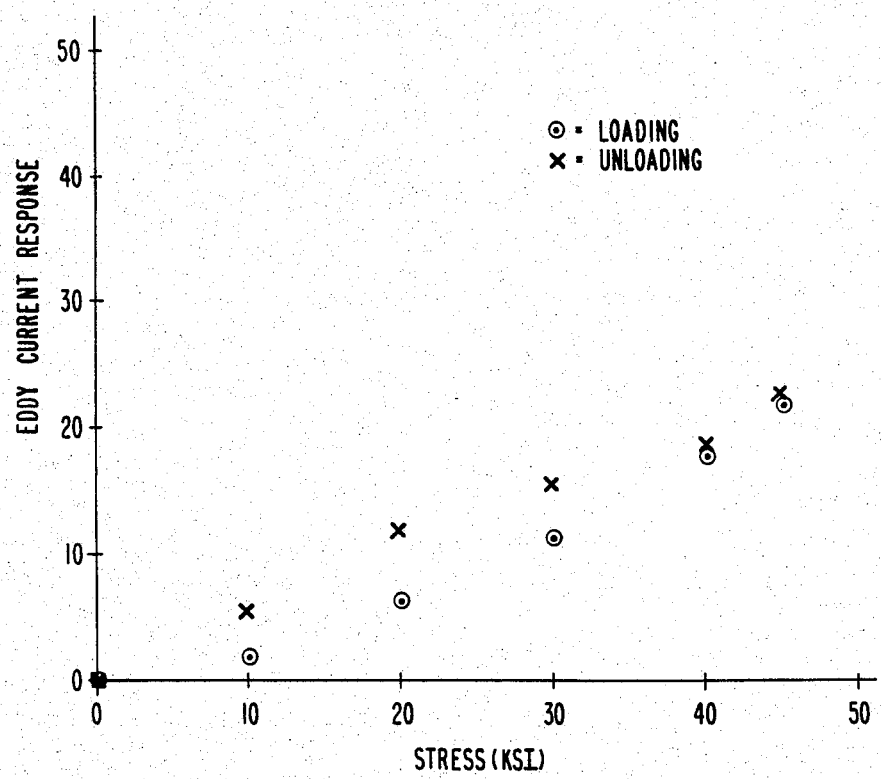
FIG. 4 is a plot of the eddy current response of the gauge of FIG. 1 when the workpiece is momentarily subjected to a constant magnetic field during the measurement period only.

The magnetic properties of a magnetic material change as the material is subjected to applied strain or stress. Specifically, the change in magnetic permeability as measured by an eddy current probe such as those shown in FIGS. 1 or 3, can be related directly to applied stress or strain. FIG. 4 shows such a response for an ASTM A533B low alloy steel specimen subjected to tensile stresses. Measurements were made with an eddy current probe as shown in FIG. 1, having a constant magnetic field bias. However, the workpiece was not continually subjected to the constant magnetic field during loading and unloading. The eddy current response, as measured with an eddy current non-destructive evaluation instrument, is a measure of electrical impedance which in turn, reflects a direct change in magnetic permeability of the workpiece. Data such as that shown in FIG. 4 can be used as calibration data to establish the applied stresses in actual structures. Using a contact probe as in FIG. 1, it is possible to move the probe while the workpiece is under load to map the distribution of applied stresses.

Figure 5:
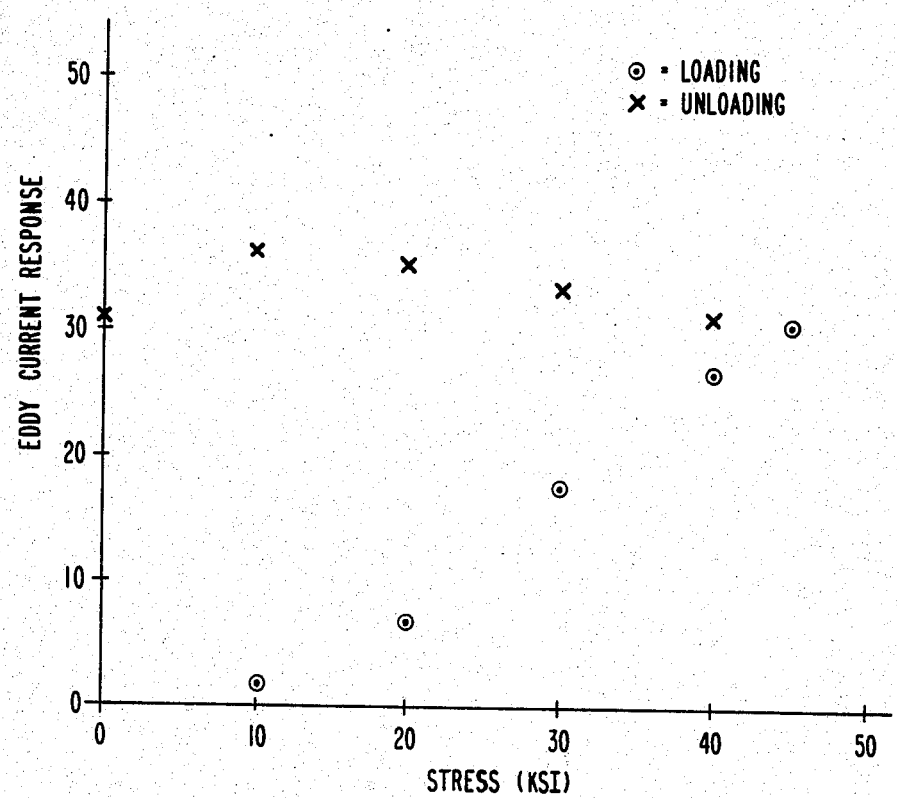
FIG. 5 is a plot of the eddy current response of the gauge of FIG. 1 when the workpiece is continually subjected to a constant magnetic field during both the application of stress and the measurement period.

Another critical feature of the magnetic properties of a workpiece under applied strain, is the discovery, made in conjunction with this invention, that if a magnetic material such as steel is subjected to a constant magnetic field prior to and during loading, the change in magnetic permeability with applied strain, while the material remains in the magnetic field, is not recovered upon removal of the applied load. This phenomenon is demonstrated for A5338 steel in FIG. 5 where the dotted circle symbols show loading up to 45 ksi and the X symbols show unloading. Note that the eddy current response exhibits a memory with regard to the maximum applied stress in the workpiece. Upon demagnetization of the workpiece, the permeability returns to the original conditions and measurements can be repeated. This feature provides the basis for the ability to locally magnetize a workpiece, load it to a predetermined condition, unload it and then measure the maximum stresses or strains developed during the loading by comparing the difference between eddy current measurements, made before and after loading to calibration data. Continuous monitoring during loading, which may be a very difficult or impossible task if the workpiece is rotating, is not required.

The method of this invention used to measure stress or strain in a magnetic workpiece as described above comprises the steps of: applying a constant magnetic field to a portion of the workpiece which will be subjected to strain; placing an eddy current probe adjacent to that portion of the workpiece; and measuring an electrical characteristic of the eddy current probe, wherein the electrical characteristic is proportional to the magnetic permeability of the workpiece. The measured value of the electrical characteristic is then compared with calibration data to determine the actual value of stress or strain in the workpiece when the electrical characteristic was measured. If no external force is applied to the workpiece, this method measures residual stress. If an external force is applied, then total stress is measured.

Maximum applied stress can be measured by subjecting the workpiece to a constant magnetic field; making a first measurement prior to the application of an external force to the workpiece; applying a force to the workpiece to strain the workpiece within the magnetic field; removing the force; measuring the electrical characteristic for a second time while the workpiece is still subjected to the magnetic field; and determining the change in the electrical characteristic, wherein the change is related to the maximum strain to which the workpiece had been subjected between the first and second measurements. Then the difference between the two measurements is compared with calibration data to determine the maximum applied stress. If the workpiece is only subjected to the constant magnetic field when the measurements are made, and the second measurement is made while the force is being applied, then the difference between the measured values will be proportional to the stress or strain resulting from the applied force.

The method of stress or strain measurement in which the workpiece is continually subjected to a magnetic field may be implemented by using a magnetically biased eddy current probe as shown in FIGS. 1 or 3, and attaching the probe to the workpiece at locations of interest prior to loading. Magnetic permeability readings as represented by the eddy current response are then made before and after, but not during, loading to indicate the change in response which in turn, will indicate the level of applied stress. The change in magnetic permeability must be compared to calibration data which has been generated for the particular material of the workpiece. This calibration data may have been generated by using traditional stress-strain measurement techniques on a standard workpiece.

When the stress or strain of a non-magnetic workpiece is to be measured, a thin layer of magnetic material is first bonded to the workpiece as shown in FIG. 3, such that this thin layer is subject to the same stress and strain as experienced by the workpiece. In this case, the change in eddy current response can be compared to calibration data established for the material used to form the thin layer.

Although the present invention has been described in terms of what are at present believed to be the preferred embodiments, it will be apparent to those skilled in the art that various changes and modifications may be made without departing from the scope of the invention. It is therefore intended that the appended claims cover all such changes and modifications.

What is claimed is:

1. A method of measuring stress in a ferromagnetic workpiece, comprising the steps of:
    applying a force to the workpiece;
    placing an eddy current coil adjacent to a portion of said workpiece which is being subjected to stress;
    applying a constant magnetic field to said portion of the workpiece;
    supplying alternating electric current to said coil, thereby inducing eddy currents in said workpiece; and
    measuring an electrical characteristic of said eddy current coil while said force is being applied to the workpiece, wherein said electrical characteristic is altered by said eddy currents and is proportional to the stress in the workpiece.

2. A method of measuring stress in a ferromagnetic workpiece as recited in claim 1, further comprising the step of:
    comparing the measured value of said electrical characteristic with calibration data to determine the actual value of stress in the workpiece when said electrical characteristic was measured.

3. A method of measuring stress applied to a ferromagnetic workpiece, comprising the steps of:
    placing an eddy current coil adjacent to a portion of the workpiece which will be subjected to stress;
    applying a constant magnetic field to said portion of the workpiece;
    supplying alternating electric current to said coil, thereby inducing eddy currents in said workpiece;
    measuring an electrical characteristic of said eddy current coil for a first time, wherein said electrical characteristic is altered by said eddy currents and is proportional to the residual stress in the workpiece;
    removing said constant magnetic field;
    applying a force to stress said portion of the workpiece;
    reapplying said constant magnetic field to said portion of the workpiece;
    resupplying alternating electric current to said coil, thereby again inducing eddy currents in said workpiece;
    measuring said electric characteristic for a second time; and
    determining the change in said electrical characteristic, wherein said change is related to the stress applied to the workpiece at the time of said second measurement.

4. A method as recited in claim 3, further comprising the step of:
    comparing said change in said electrical characteristic with calibration data to determine the actual value of stress applied to the workpiece.

5. A method of measuring residual stress in a ferromagnetic workpiece, comprising the steps of:
    placing an eddy current coil adjacent to a portion of said workpiece which has been previously subjected to stress;
    applying a constant magnetic field to said portion of the workpiece;
    supplying alternating electric current to said coil, thereby inducing eddy currents in said workpiece; and
    measuring an electrical characteristic of said eddy current coil, wherein said electrical characteristic is altered by said eddy currents and is proportional to residual stress in the workpiece.

6. A method of measuring residual stress in a ferromagnetic workpiece, as recited in claim 5, further comprising the step of:
    comparing the measured value of said electrical characteristic with calibration data to determine the actual value of residual stress in the workpiece when said electrical characteristic was measured.

7. A method of measuring stress in a ferromagnetic workpiece, comprising the steps of:
    placing an eddy current probe adjacent to a portion of the workpiece which will be subjected to stress;
    applying a constant magnetic field to said portion of the workpiece;
    measuring an electrical characteristic of said eddy current probe for a first time, wherein said electrical characteristic is proportional to residual stress in the workpiece;
    applying a force to the workpiece to strain the workpiece within said constant magnetic field;
    removing said force;
    measuring said electrical characteristic for a second time while the workpiece is still subjected to said constant magnetic field; and
    determining the change in said electrical characteristic, wherein said change is related to the maximum stress to which said workpiece had been subjected between the first and second measurements.

8. A method as recited in claim 7, further comprising the step of:
    comparing said change in said electrical characteristic with calibration data to determine the actual value of stress to which the workpiece had been subjected between said first and second measurements.

9. A method of measuring stress in a nonferromagnetic workpiece, comprising the steps of:
   attaching a layer of ferromagnetic material to a portion of the workpiece which will be subjected to stress;
   applying a force to the workpiece to stress the workpiece and said ferromagnetic layer;
   placing an eddy current coil adjacent to a portion of said ferromagnetic layer;
   applying a constant magnetic field to said portion of said ferromagnetic layer;
   supplying alternating electric current to said coil, thereby inducing eddy currents in said ferromagnetic layer; and
   measuring an electrical characteristic of said eddy current coil while said force is being applied in the workpiece, wherein said electrical characteristic is altered by said eddy currents and is proportional to the stress in said ferromagnetic layer.

10. A method of measuring stress in a nonferromagnetic workpiece as recited in claim 9, further comprising the step of:
    comparing the value of said electrical characteristic with calibration data to determine the actual value of stress in the workpiece when said electrical characteristic was measured.

11. A method of measuring stress in a nonferromagnetic workpiece, comprising the steps of:
    attaching a layer of ferromagnetic material to a portion of the workpiece which will be subjected to stress;
    placing an eddy current coil adjacent to said ferromagnetic layer;
    applying a constant magnetic field to a portion of said layer of a ferromagnetic material which will be subjected to stress;
    supplying alternating electric current to said coil, thereby inducing eddy currents in said ferromagnetic layer;
    measuring an electrical characteristic of said eddy current coil for a first time, wherein said electrical characteristic is altered by said eddy currents and said proportional to residual stress in said ferromagnetic sheet;
    removing said constant magnetic field;
    applying a force to stress the workpiece and said ferromagnetic sheet;
    reapplying said constant magnetic field to said portion of said ferromagnetic sheet;
    resupplying alternating electric current to said coil, thereby again inducing eddy currents in said ferromagnetic layer;
    measuring said electrical characteristic for a second time; and
    determining the change in said electrical characteristic, wherein said change is related to the stress applied to the workpiece at the time of said second measurement.

12. A method as recited in claim 11, further comprising the step of:
    comparing said change in said electrical characteristic with calibration data to determine the actual value of stress applied to the workpiece at the time of said second measurement.

13. A method of measuring residual stress in a nonferromagnetic workpiece, comprising the steps of:
    attaching a layer of ferromagnetic material to a portion of the workpiece which will be subjected to stress;
    applying a force to the workpiece to strain the workpiece and the ferromagnetic layer;
    removing said force;
    placing an eddy current coil adjacent to a portion of said ferromagnetic layer which has been subjected to strain;
    applying a constant magnetic field to said portion of said ferromagnetic layer;
    supplying an alternating electric current to said coil, thereby inducing eddy currents in said ferromagnetic layer; and
    measuring an electrical characteristic of said eddy current coil, wherein said electrical characteristic is altered by said eddy current and is proportional to residual stress in the workpiece.

14. A method of measuring residual stress in a nonferromagnetic workpiece, as recited in claim 13, further comprising the step of:
    comparing the measured value of said electrical characteristic with calibration data to determine the actual value of residual stress when said electrical characteristic was measured.

15. A method of measuring stress in a non-ferromagnetic workpiece, comprising the steps of:
    attaching a layer of ferromagnetic material to a portion of the workpiece which will be subjected to stress;
    placing an eddy current probe adjacent to said portion of said ferromagnetic layer;
    applying a constant magnetic field to said portion of aid ferromagnetic layer;
    measuring an electrical characteristic of said eddy current probe for a first time, wherein said electrical characteristic is proportional to the strain of said ferromagnetic layer;
    applying a force to the workpiece to strain the workpiece and said ferromagnetic layer within said constant magnetic field;
    removing said force;
    measuring said electrical characteristic for a second time while said ferromagnetic sheet is still subjected to said constant magnetic field; and
    determining the change in said electrical characteristic, wherein said change is related to the maximum stress to which the workpiece had been subjected between said first and second measurements.

16. A method as recited in claim 15, further comprising the step of:
    comparing said change in said electrical characteristic with a calibration curve to determine the actual value of strain to which the workpiece and said ferromagnetic sheet had been subjected between said first and second measurements.

* * * * *